United States Patent

Chen

(10) Patent No.: US 9,248,506 B2
(45) Date of Patent: Feb. 2, 2016

(54) TOOL SHANK

(71) Applicant: Feng-Tien Chen, Taichung (TW)

(72) Inventor: Feng-Tien Chen, Taichung (TW)

( * ) Notice: Subject to any disclaimer, the term of this patent is extended or adjusted under 35 U.S.C. 154(b) by 389 days.

(21) Appl. No.: 13/950,302

(22) Filed: Jul. 25, 2013

(65) Prior Publication Data

US 2015/0030407 A1    Jan. 29, 2015

(51) Int. Cl.
| | |
|---|---|
| *B23B 31/117* | (2006.01) |
| *B23C 5/26* | (2006.01) |
| *B23Q 3/12* | (2006.01) |
| *B23Q 11/00* | (2006.01) |
| *B23B 31/00* | (2006.01) |
| *B23B 29/02* | (2006.01) |

(52) U.S. Cl.
CPC ............. *B23B 31/006* (2013.01); *B23B 29/022* (2013.01); *B23B 2231/0272* (2013.01); *B23B 2231/0284* (2013.01); *B23B 2231/0288* (2013.01); *B23B 2231/0292* (2013.01); *B23B 2250/16* (2013.01); *B23B 2270/06* (2013.01); *B23Q 3/12* (2013.01); *Y10T 279/17965* (2015.01); *Y10T 409/30952* (2015.01); *Y10T 409/304312* (2015.01)

(58) Field of Classification Search
CPC ...................... B23B 31/006; B23B 2231/0284; B23B 2231/0272; B23B 2231/0288; B23B 2231/02; Y10T 409/30952; Y10T 409/309408; Y10T 279/17957; Y10T 279/17965; Y10T 408/76
USPC ............ 409/234, 232; 279/102–103; 408/143
See application file for complete search history.

(56) References Cited

U.S. PATENT DOCUMENTS

| | | | | |
|---|---|---|---|---|
| 4,657,454 A | * | 4/1987 | Migita ................ | B23B 31/117 279/43.1 |
| 4,934,883 A | * | 6/1990 | Andersson ............ | B23B 31/006 279/103 |
| 5,201,621 A | * | 4/1993 | McMurtry ............ | B23B 31/006 279/900 |
| 5,716,173 A | * | 2/1998 | Matsumoto ........... | B23B 31/006 408/239 A |
| 5,775,857 A | * | 7/1998 | Johne ................... | B23B 31/005 279/143 |
| 6,077,003 A | * | 6/2000 | Laube .................. | B23B 31/006 279/103 |
| 6,599,068 B1 | * | 7/2003 | Miyazawa ............ | B23B 31/006 279/103 |
| 7,186,064 B1 | * | 3/2007 | Erickson .............. | B23B 31/006 279/103 |

FOREIGN PATENT DOCUMENTS

| | | | | |
|---|---|---|---|---|
| CN | 102126147 A | * | 6/2011 | |
| DE | 4110857 A1 | * | 10/1992 | |
| FR | 2877596 A1 | * | 5/2006 | |
| JP | 09-038837 A | * | 2/1997 | |

* cited by examiner

*Primary Examiner* — Erica E Cadugan
(74) *Attorney, Agent, or Firm* — Leong C. Lei (57) ABSTRACT

The tool shank contains a taper member, a flange member, a holder member, a clamped member, and a number of slits. The taper member has a conic shape extended along an axial direction with a top section and a bottom section. The flange member is beneath the bottom section of the taper member. The holder member is extended downward from a bottom side of the flange member along the axial direction. The clamped member is extended upward from the top section of the taper member. The slits are configured at intervals around the bottom section surrounding the axial direction. Each slit defines a slightly outwardly bulge. The bulges increase the contact area with and avoid gaps to a tapered socket of a spindle. As such, the tool shank is tightly jointed to the spindle during high-speed rotation without causing vibration and damage.

12 Claims, 11 Drawing Sheets

PRIOR ART

FIG.1

PRIOR ART

TOOL SHANK

TECHNICAL FIELD OF THE INVENTION

The present invention is generally related to machine tools, and more particular to a shank for fitting a tool to the spindle of a machine tool.

DESCRIPTION OF THE PRIOR ART

Figure 1:
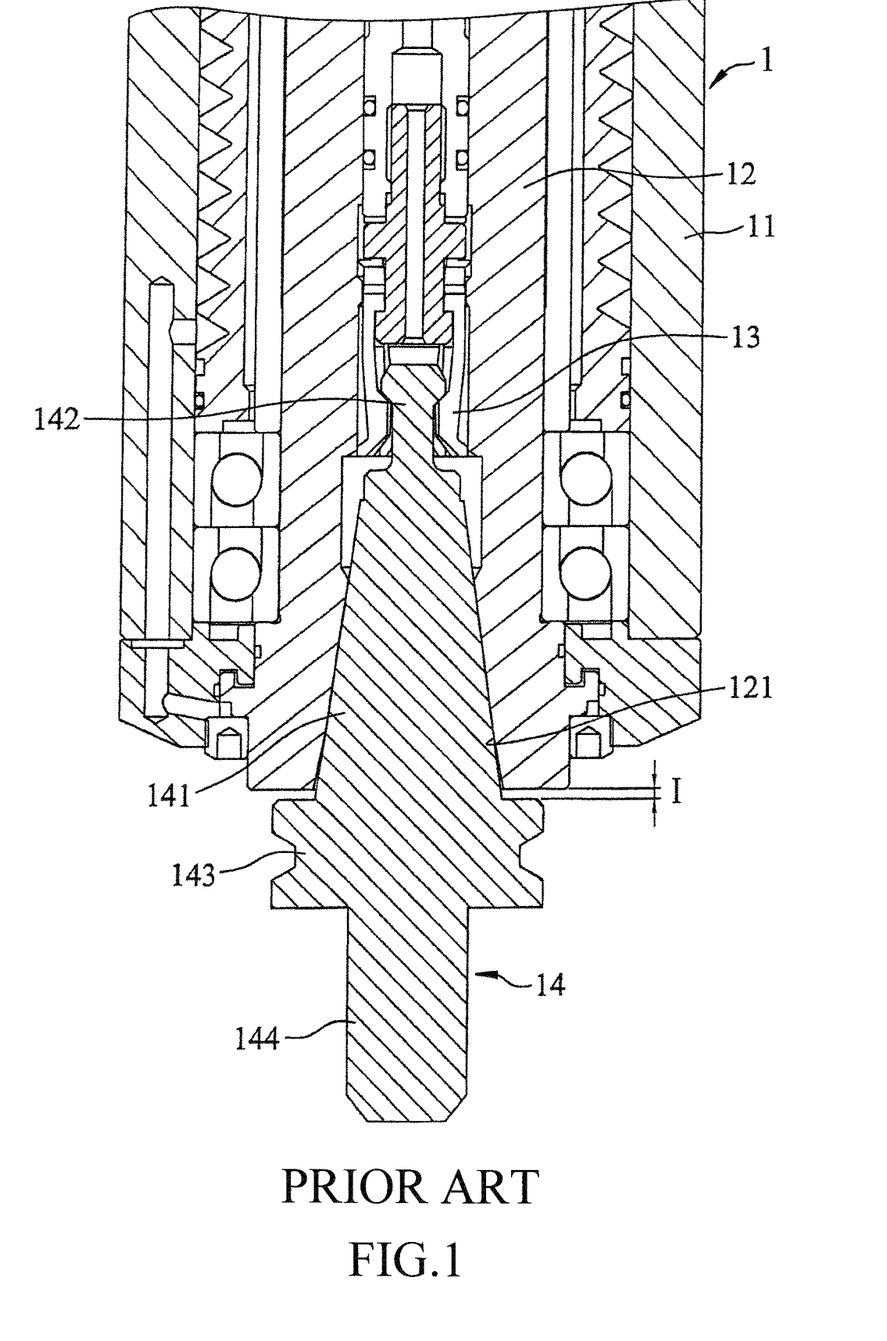
FIG. 1 is a schematic sectional diagram showing a conventional BT shank installed on a spindle assembly.

FIG. 1 shows a conventional BT shank 14 installed on a spindle assembly 1 of a CNC machine tool. The spindle assembly 1 contains a casing 11, a spindle 12 in the casing 11 capable of high-speed rotation, and a damper 13 inside the spindle 12 capable of vertical movement. The spindle 12 has a tapered socket 121 adjacent to a bottom end of the spindle 12 for receiving the BT shank 14. The BT shank 14 contains a cone-shaped taper member 141, a clamped member 142 extended from the taper member 141, a flange member 143 beneath the taper member 141, and a holder member 144 extended downward from the flange member 143 for installing a tool (not shown). The taper member 141 is plugged into the tapered socket 121 and the BT shank 14 is further secured by the damper 13 clamping the clamped member 142. As such, the BT shank 14 is driven into high-speed rotation by the spindle 12 to perform various machining processes. The joining of the conventional BT shank 14 to the spindle 12 is not reliable as it relies only on the coupling between the tapered socket 121 and the taper member 141. The flange member 143 is not in contact with a bottom side of the spindle 12 and a gap I (which is exaggerated in the figure). During a high-speed operation of the spindle 12, its internal temperature would rise and the tapered socket 121 would expand, thereby reducing the contact area between the tapered socket 121 and the taper member 141, and causing the BT shank to vibrate and get damaged. The precision of the machining processes is therefore deteriorated.

Figure 2:
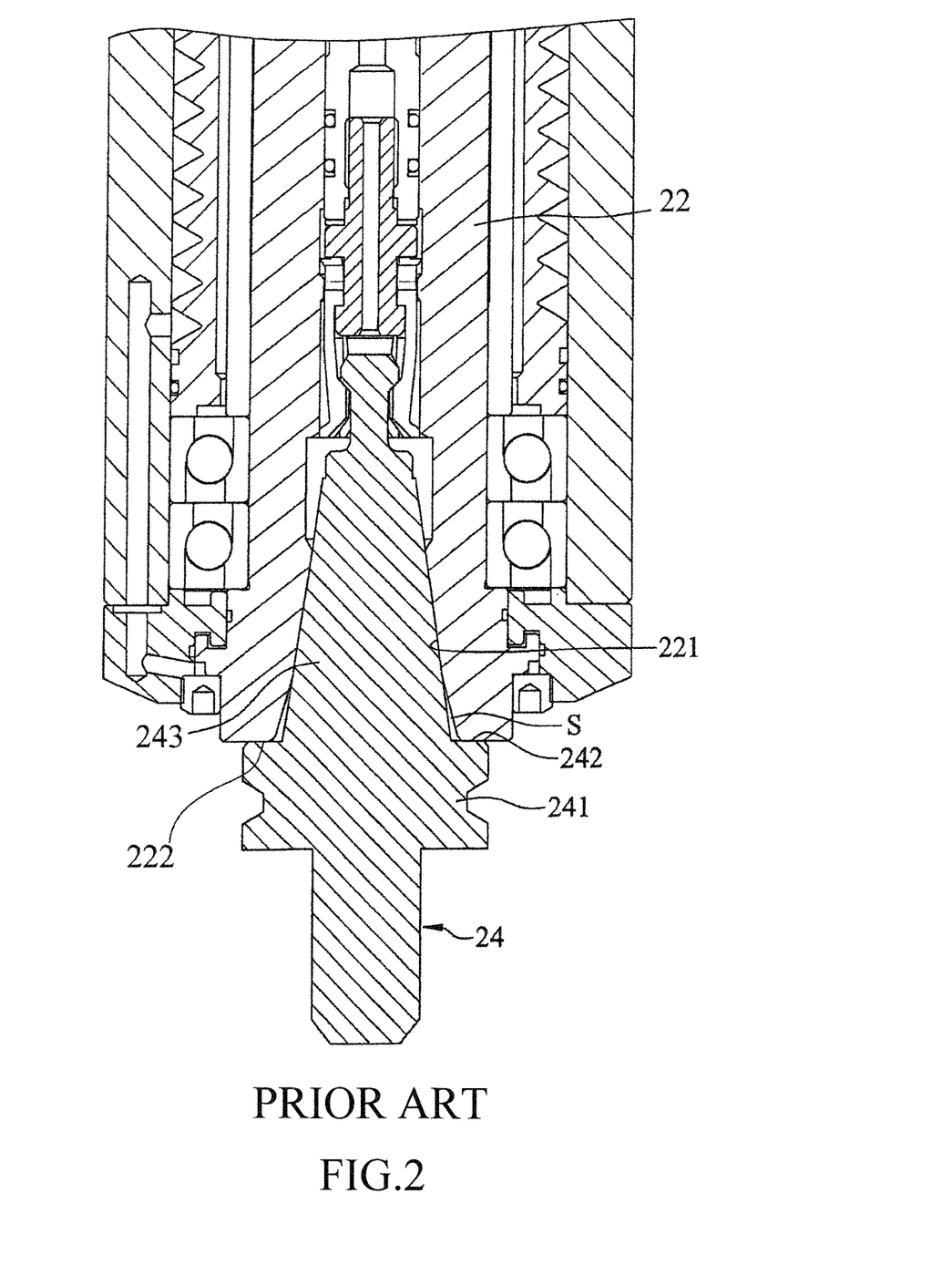
FIG. 2 is a schematic sectional diagram showing a conventional BBT shank installed on a spindle assembly.

FIG. 2 shows a conventional BBT shank 24 which differs from the BT shank 14 in that a step surface 242 is configured on a top side of its flange member 241. The step surface 242 is in a tight contact with a lateral surface 222 of the spindle 22. As such, even though a tapered socket 221 of the spindle 22 is thermally expanded, the coupling between the tapered socket 221 and a taper member 243 is maintained with the contact between the step surface 242 and the flat surface 222. However, a gap S is still present between the taper member 243 and the tapered socket 221. Again, this would cause the BBT shank 24 to vibrate and get damaged. The precision of the machining processes is also deteriorated.

SUMMARY OF THE INVENTION

Therefore, a novel tool shank is provided herein capable of tightly and reliably joining to the spindle of a machine tool with superior robustness even when the machine tool is operated under a high speed.

The tool shank contains a taper member, a flange member, a holder member, and a number of slits.

The taper member has a conic shape extended along an axial direction with a top section of a smaller diameter and a bottom section of a larger diameter.

The flange member is beneath the bottom section of the taper member.

The holder member is extended downward from a bottom side of the flange member along the axial direction.

The slits are configured at intervals around the bottom section of the taper member surrounding the axial direction. Each slit defines a slightly outwardly bulge on the bottom section of the taper member.

The advantages of the present invention are as follows. The slightly outward bulges defined by the slits increase the contact area with the tapered socket of a spindle, thereby avoiding the gaps happened in the prior arts. As such, a tool is tightly jointed to the spindle during its high-speed rotation without causing vibration. On the other hand, due to the increased contact area to the tapered socket, the structural strength of the present invention during machining process is enhanced and as such the present invention is prevented from being damaged by a lateral external force, thereby achieving the machining reliability.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become apparent to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 3:
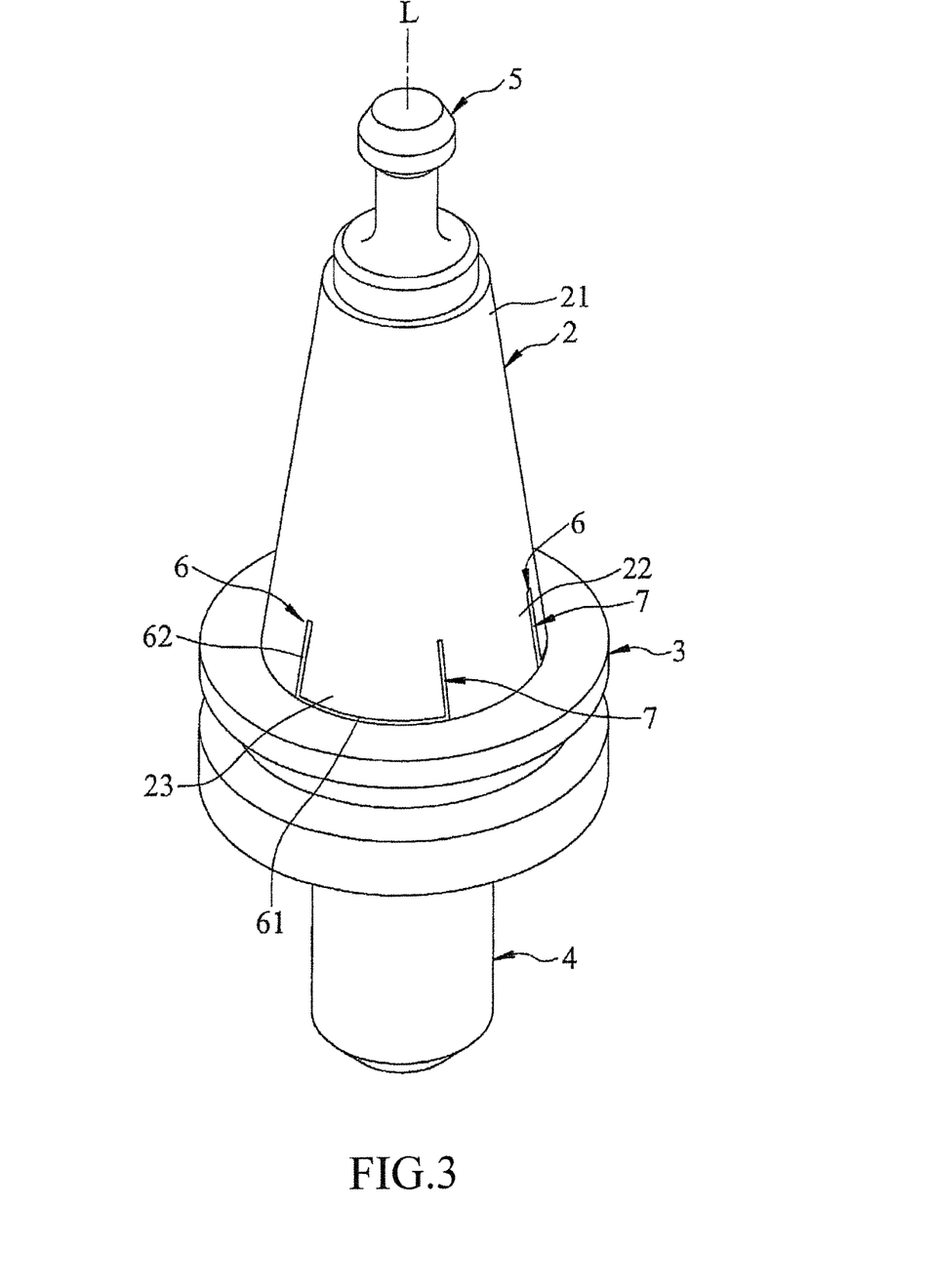
FIG. 3 is a perspective diagram of a tool shank according to a first embodiment of the present invention.
Figure 4:
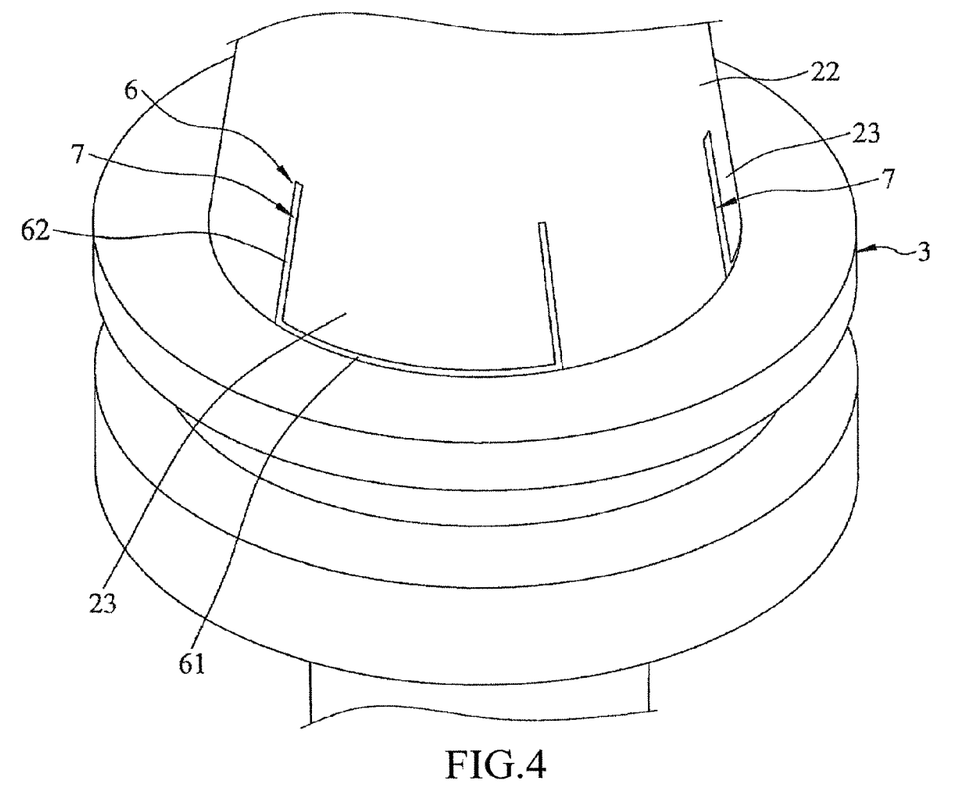
FIG. 4 a partially enlarged perspective diagram showing a number of slits on a taper member of the tool shank of FIG. 3.
Figure 8:
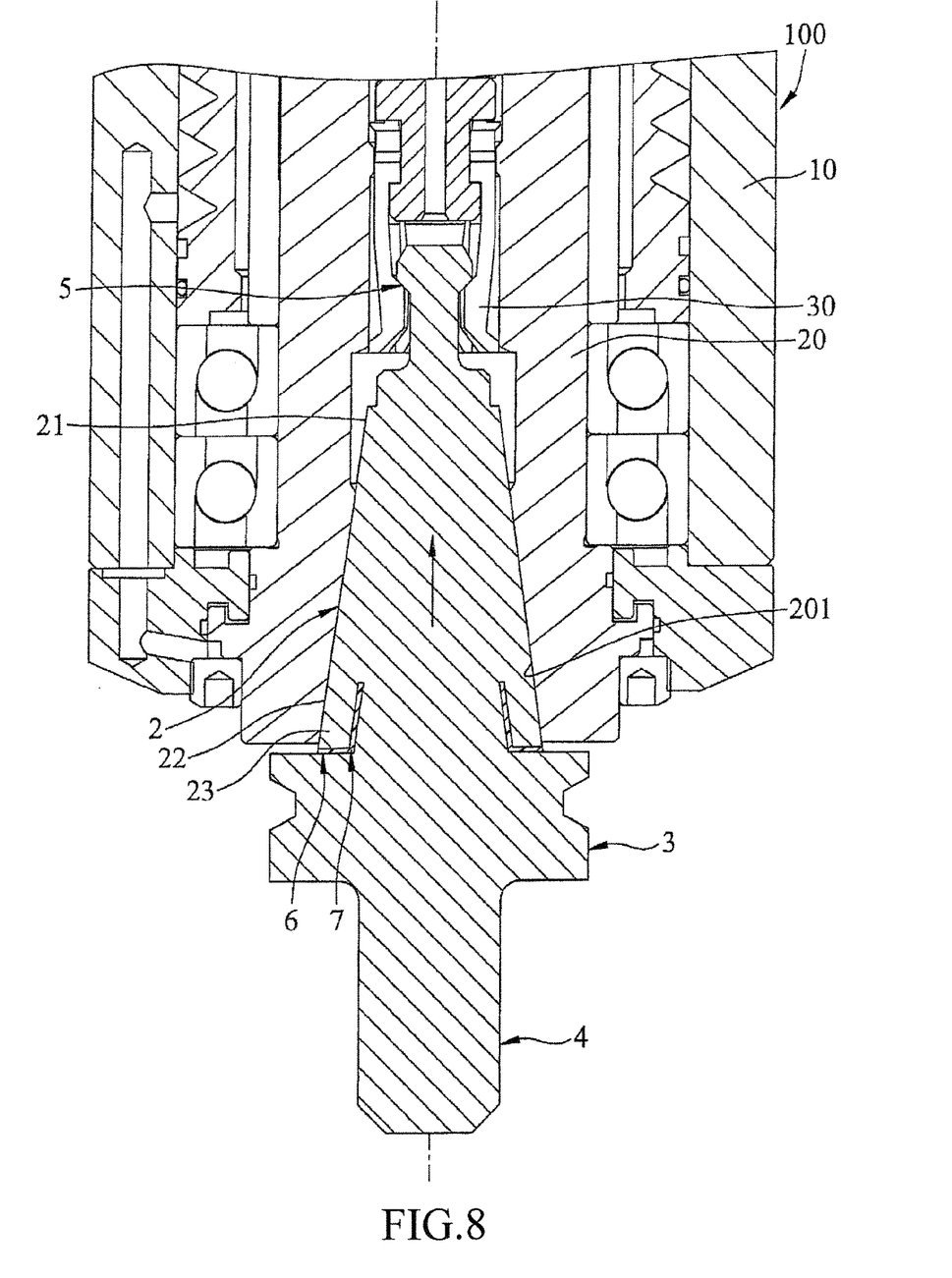
FIG. 8 is a schematic sectional diagram showing the application scenario of FIG. 7 when the tool shank is completely installed on the spindle assembly.

As shown in FIGS. 3, 4, and 8, a tool shank according to a first embodiment of the present invention is installed on a spindle assembly 100. The spindle assembly 10 contains a casing 10, a spindle 20 in the casing 10 capable of high-speed rotation, and a clamper 30 inside the spindle 20 capable of vertical movement. The spindle 20 has a tapered socket 201 adjacent to a bottom end of the spindle 20. The tool shank of the present embodiment contains a taper member 2, a flange member 3, a clamped member 5, a holder member 4, a number of slits 6, and a number of flexible layers 7.

The taper member 2 is detachably mounted to the tapered socket 201 and has a conic shape that is narrowed to a top end and is broadened to a bottom end along an axial direction L. The taper member 2 therefore has a top section 21 of a smaller diameter and a bottom section 22 of a larger diameter.

The flange member 3 is beneath the bottom section 22 of the taper member 2 and has a greater diameter than that of the bottom section 22.

The holder member 4 is extended downward from a bottom side of the flange member 3, and the holder member 4's axis is exactly on the axial direction L. The holder member 4 is for the installation of a tool (not shown).

The clamped member 5 is extended upward from the top section 21 of the taper member 2, and is for the clamping by the clamper 30 of the spindle assembly 100.

The slits 6 are configured at intervals around the bottom section 22 of the taper member 2 surrounding the axial direction L. Each slit 6 defines a slightly outwardly bulge 23 on the taper member 2.

Figure 5:
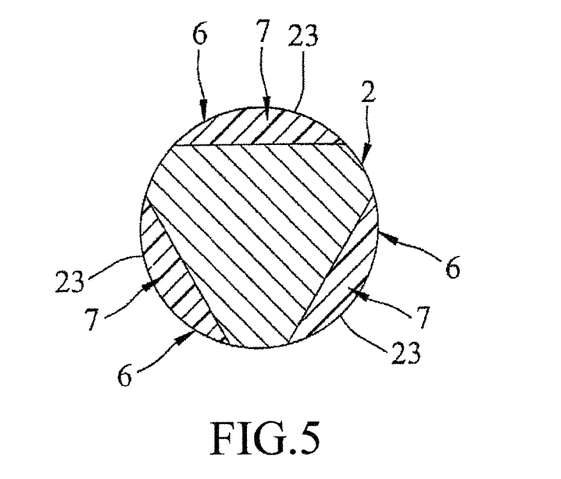
FIG. 5 is a cross-sectional diagram showing an embodiment of the slits of FIG. 4 along the V-V line of FIG. 7.
Figure 6:
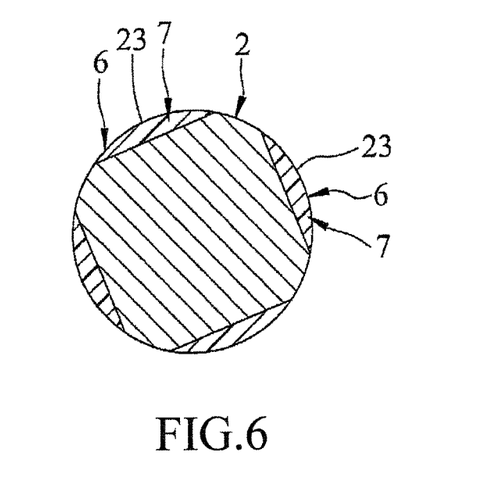
FIG. 6 is a cross-sectional diagram showing another embodiment of the slits of FIG. 4 along the V-V line of FIG. 7.

Each slit 6 contains an inwardly indented lateral segment 61 perpendicular to the axial direction L on the bottom section 22, and two vertical segments 62 extended from the lateral segment 61's two ends towards the top section 21. The slits are formed by machine cutting and the number of slits can be 3, as shown in FIG. 5, or 4 as shown in FIG. 6, or other appropriate number. As the slits 6 are formed by machine cutting, due to the stress from the machining, the bulges 23 would be slightly extended radially outward with high tension.

The flexible layers 7 are formed by injecting a flexible material such as engineering plastic into the slits 6. These flexible layers 7 prevent dusts, vapors from permeating into the slits 6. In addition, the flexible layers 7 provide cushion to the bulges 23 to avoid their damage, thereby enhancing the reliability of the present invention.

Figure 7:
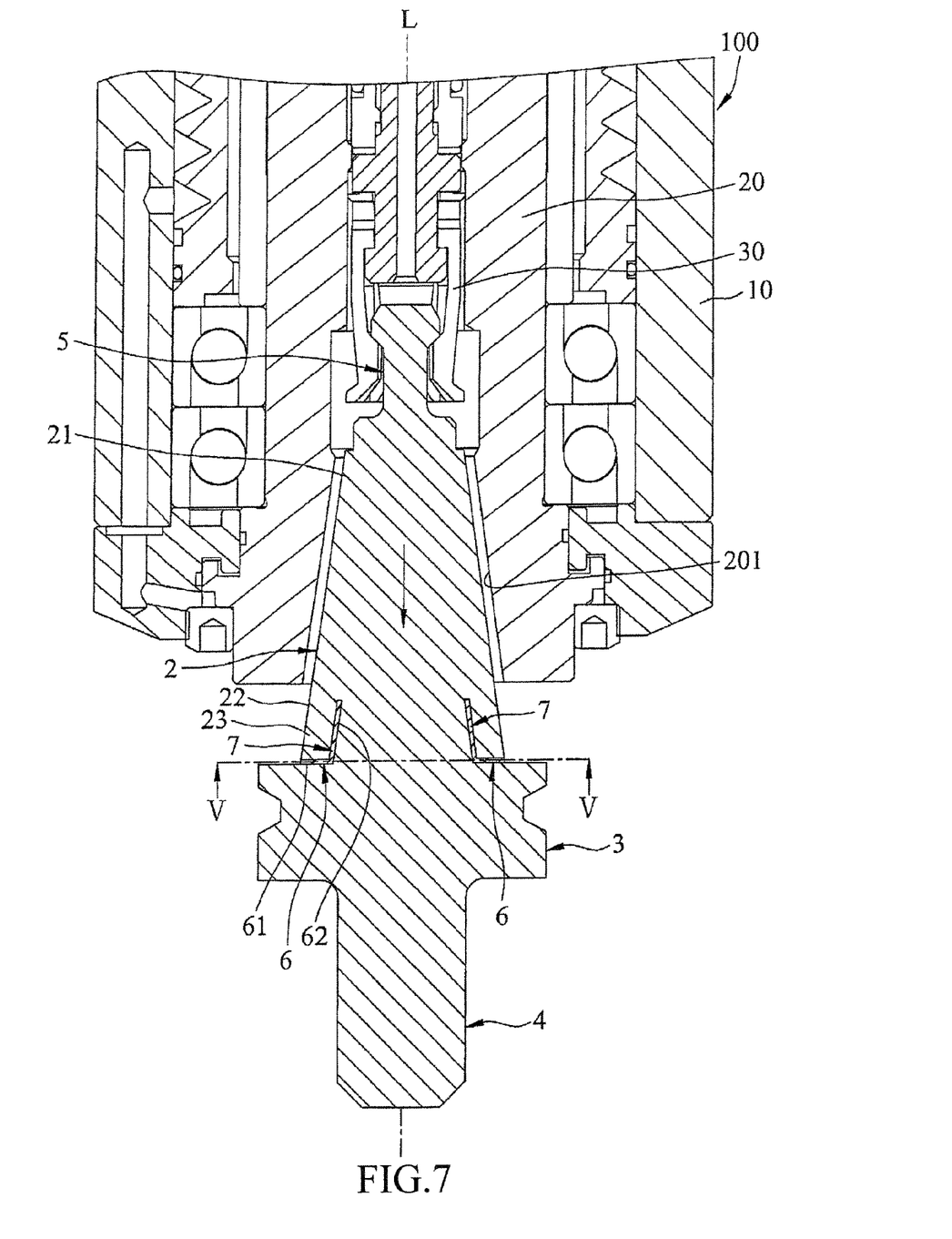
FIG. 7 is a schematic sectional diagram showing an application scenario of the tool shank of FIG. 3 as a BT shank when it is not entirely installed on a spindle assembly.

In an application scenario shown in FIGS. 7 and 8, the present invention works as a BT shank. As illustrated, when the taper member 2 is plugged into the tapered socket 201 of the spindle assembly 100, due to the bulges 23's outward expansion, the taper member 2 is tightly joined to the tapered socket 201 as shown in FIG. 8. Therefore, the spindle 20 can spin in a significantly high speed without causing vibration, thereby enhancing the machining reliability and precision.

Figure 9:
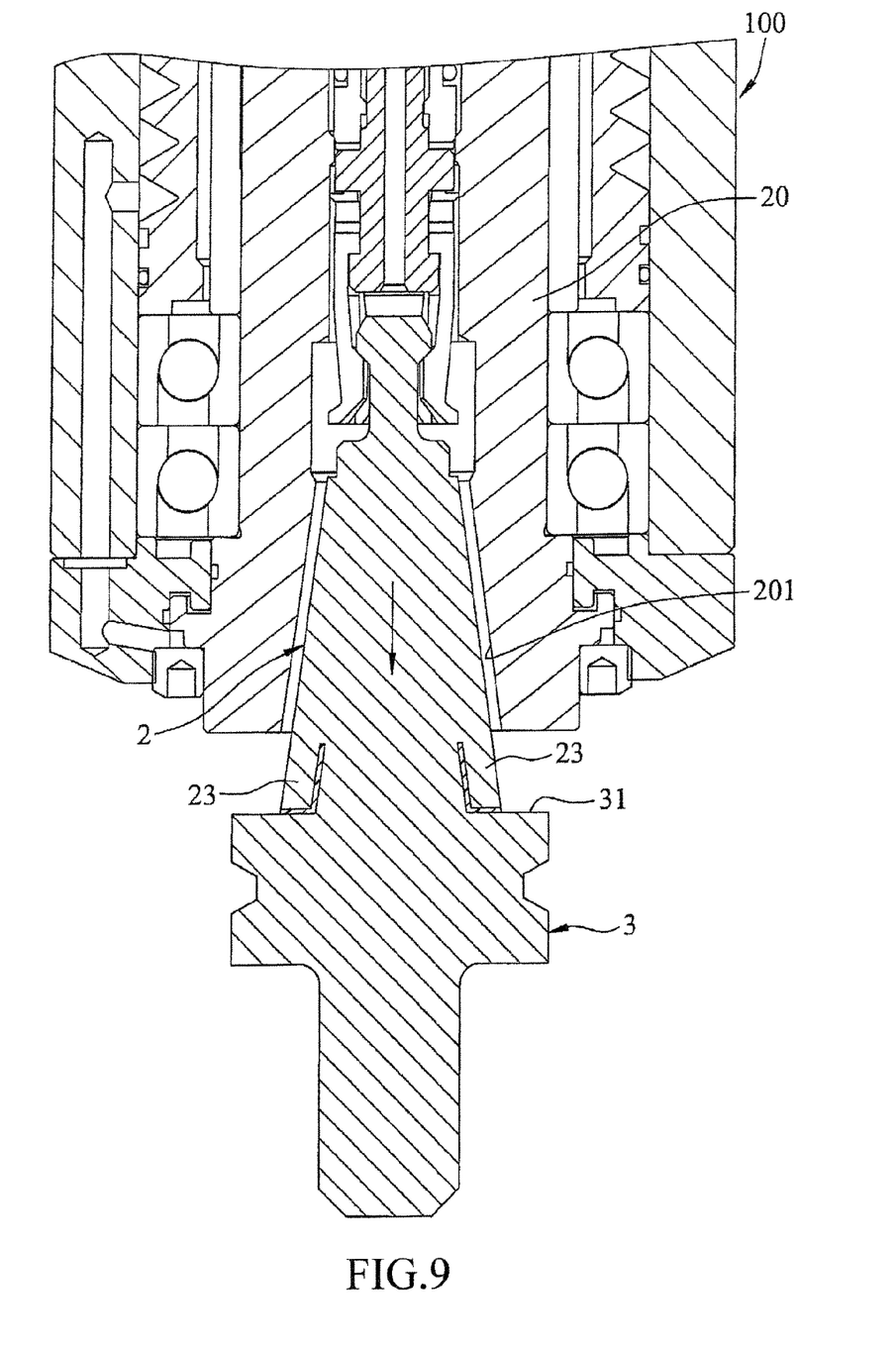
FIG. 9 is a schematic sectional diagram showing an application scenario of a tool shank according to a second embodiment of the present invention as a BBT shank when it is not entirely installed on a spindle assembly.
Figure 10:
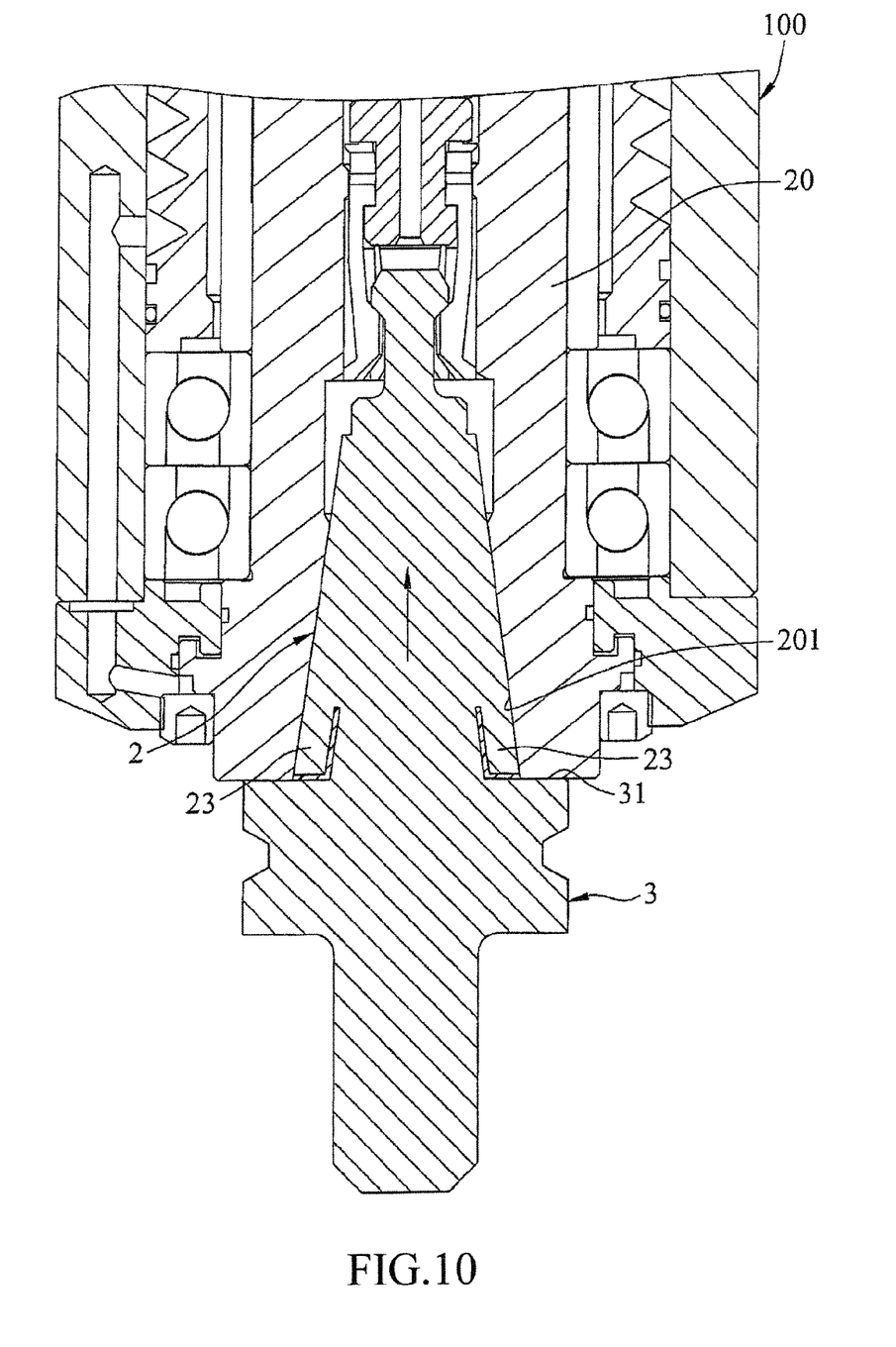
FIG. 10 is a schematic sectional diagram showing the application scenario of FIG. 9 when the tool shank is completely installed on the spindle assembly.

A second embodiment of the present invention is similar to the previous first embodiment except that a step surface 31 is formed on a top side of the flange member 3. In an application scenario shown in FIGS. 9 and 10, the present invention works as a BBT shank. As illustrated, when the taper member 2 is plugged into the tapered socket 201 of the spindle assembly 100, the taper member 2 is tightly joined to the tapered socket 201 and no gap is left between the tapered socket 201 and the taper member 2. Therefore, the spindle 20 can spin in an even higher speed without causing vibration, thereby enhancing the machining reliability and precision.

Figure 11:
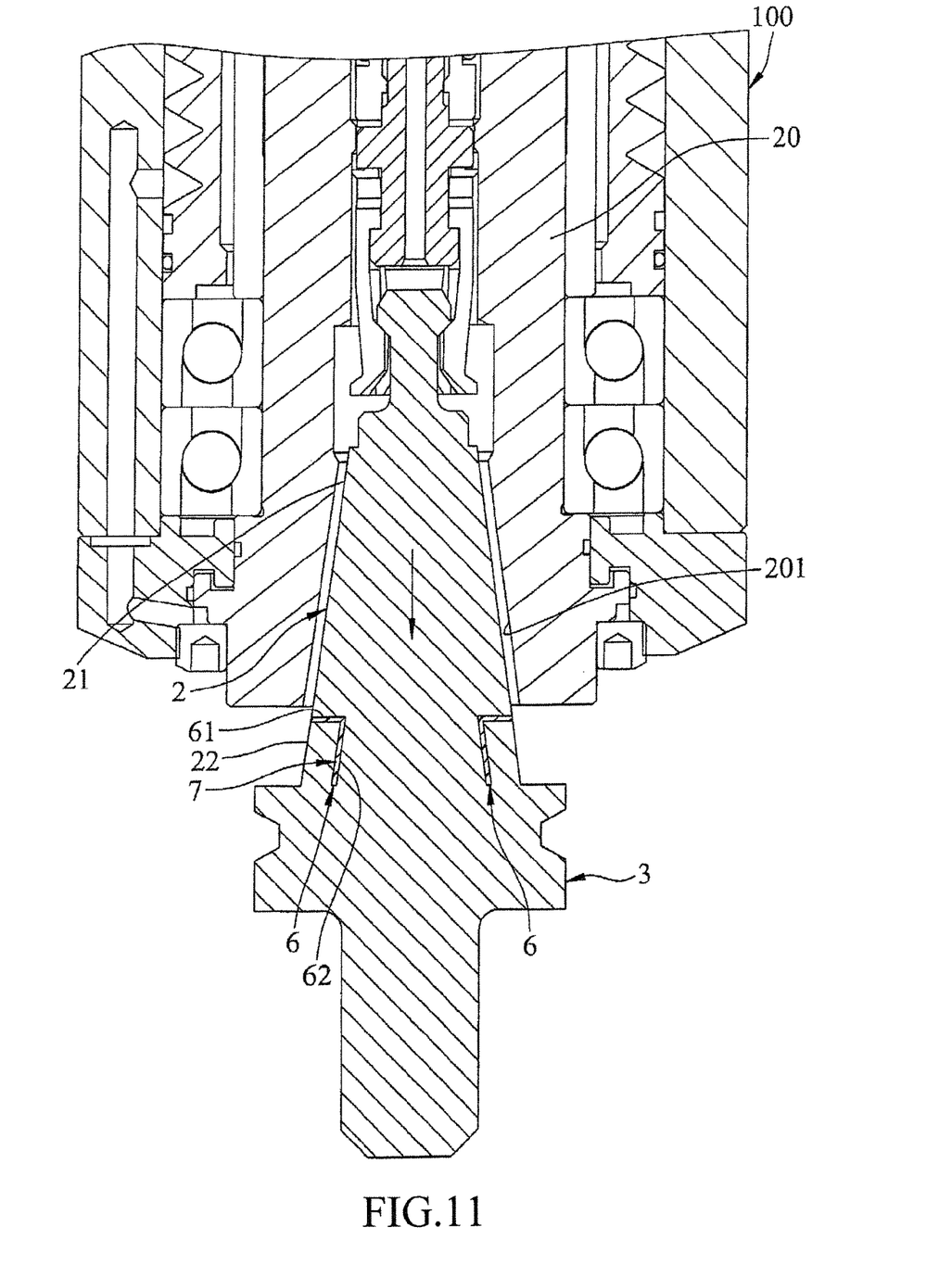
FIG. 11 is a schematic sectional diagram showing an application scenario of a tool shank according to a third embodiment of the present invention when it is not entirely installed on a spindle assembly.
Figure 12:
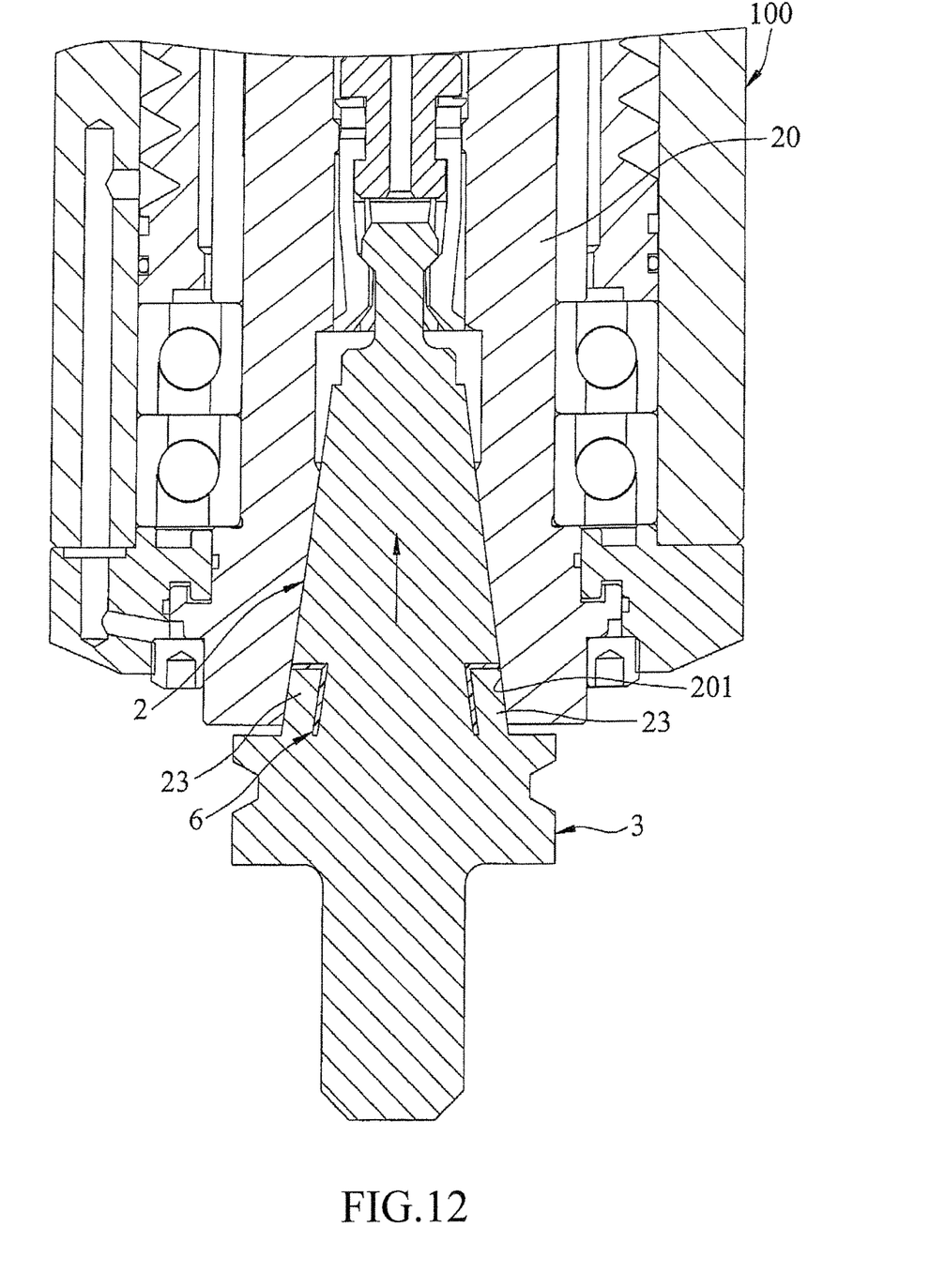
FIG. 12 is a schematic sectional diagram showing the application scenario of FIG. 11 when the tool shank is completely installed on the spindle assembly.

A third embodiment of the present invention as shown in FIGS. 11 and 12 differs from the previous embodiments as follows.

Each slit 6 contains an inwardly indented lateral segment 61 perpendicular to the axial direction L on the bottom section 22, and two vertical segments 62 extended from the lateral segment 61's two ends towards the flange member 3.

The tool shank of the present invention has the following advantages.

Firstly, the slightly outward bulges 23 defined by the slits 6 increase the contact area with the tapered socket 201 of a spindle 20, thereby avoiding the gaps happened in the prior arts. As such, a tool is tightly jointed to the spindle 20 during its high-speed rotation without causing vibration, thereby enhancing the machining precision.

Secondly, due to the increased contact area to the tapered socket 201, the structural strength of the present invention during machining process is enhanced and as such the present invention is prevented from being damaged by a lateral external force, thereby achieving the machining reliability.

Thirdly, the flexible layers 7 prevent dusts and vapors from permeating into the slits 6, and provide cushion to the bulges 23, again enhancing the reliability of the present invention.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A tool shank, comprising:
a taper member having a conic shape having a conic outer surface extended along an axis in an axial direction, the conic outer surface having a top section of a smaller diameter and a bottom section of a larger diameter, the conic outer surface configured to be received in a corresponding tapered socket of a tool spindle when the tool shank is clamped in the tool spindle;
a flange member beneath the bottom section of the conic outer surface of the taper member;
a holder member, configured for receiving a tool therein, extended downward from a bottom side of the flange member along the axial direction;
a plurality of slits configured at intervals around the bottom section of the conic outer surface of the taper member surrounding the axial direction;
a plurality of bulges, each defined by a respective one of the slits, on the bottom section of the conic outer surface of the taper member, which bulges are tensioned in a manner so as to be biased radially outward; and
a plurality of flexible members, wherein each of the slits has a respective one of the plurality of flexible members provided therein;
wherein each of the slits is formed from two slit segments that intersect to form a V shape.

2. The tool shank according to claim 1, wherein for each of the slits, the two slit segments comprise an inwardly indented lateral segment on the bottom section, and a vertical segment extended from one end of the respective lateral segment in a direction towards the top section.

3. The tool shank according to claim 2, wherein the number of slits is three.

4. The tool shank according to claim 3, wherein the flexible members are formed by injecting a flexible material inside the slits.

5. The tool shank according to claim 2, wherein the number of slits is four.

6. The tool shank according to claim 5, wherein the flexible members are formed by injecting a flexible material inside the slits.

7. The tool shank according to claim 2, wherein the flexible members are formed by injecting a flexible material inside the slits.

8. The tool shank according to claim 1, wherein the flexible members are formed by injecting a flexible material inside the slits.

9. The tool shank according to claim 1, wherein the flexible members are made of plastic.

10. The tool shank according to claim 1, further comprising a clamped member extended upward from the top section of the conic outer surface of the taper member.

11. The tool shank according to claim 1, wherein the flange member comprises a step surface on a top side.

12. The tool shank according to claim 1, wherein for each of the slits, the two slit segments comprise an inwardly indented lateral segment on the bottom section, and a vertical segment extended from one end of the respective lateral segment towards the flange member.

* * * * *